May 16, 1967 G. R. ANDERSON, JR 3,320,446
ROTOR SHAFT BEARING FOR AN ELECTRIC MOTOR
Filed April 12, 1965 2 Sheets-Sheet 1
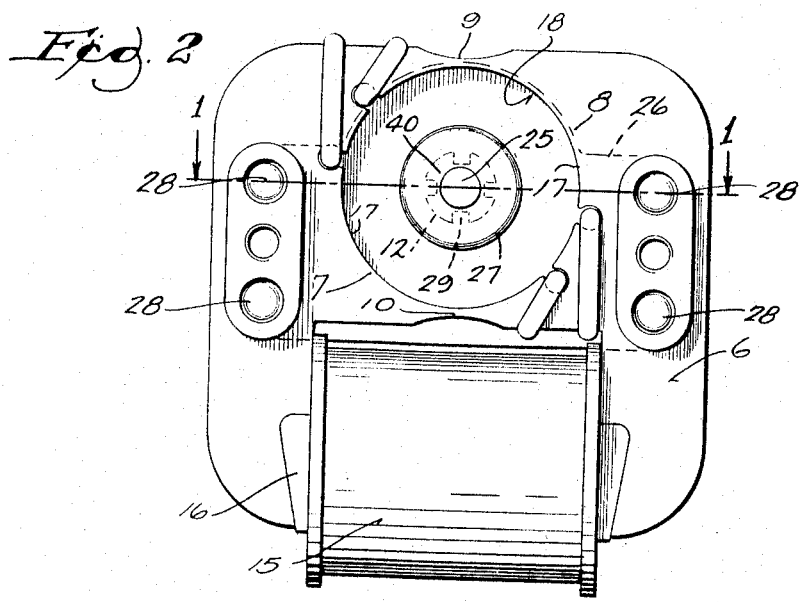
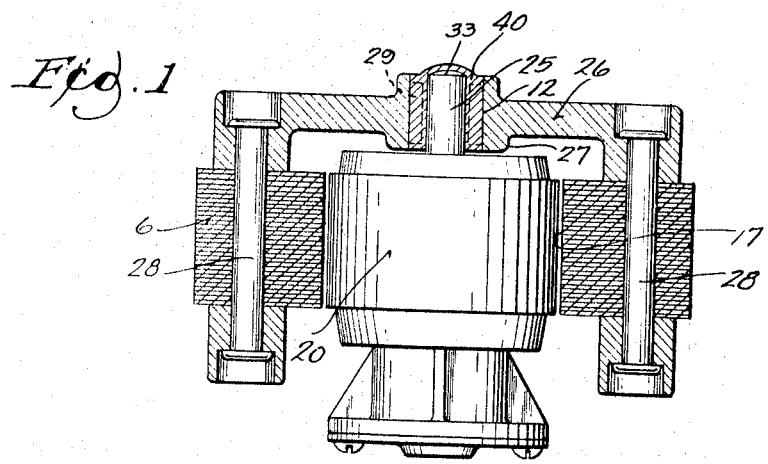
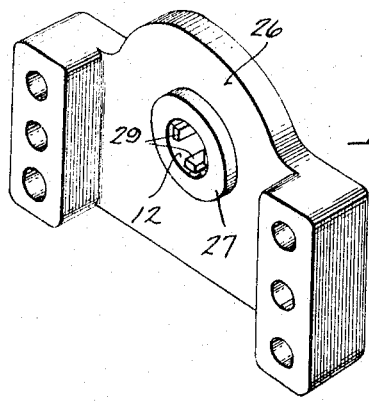
INVENTOR.
GORDON R. ANDERSON, JR
BY
Wheeler, Wheeler & Wheeler
ATTORNEYS INVENTOR.
GORDON R. ANDERSON, Jr
BY
Wheeler, Wheeler & Wheeler
ATTORNEYS

United States Patent Office 3,320,446
Patented May 16, 1967

3,320,446
ROTOR SHAFT BEARING FOR AN ELECTRIC MOTOR
Gordon R. Anderson, Jr., Racine, Wis., assignor, by mesne assignments, to MSL Industries, Inc., Racine, Wis., a corporation of Minnesota
Filed Apr. 12, 1965, Ser. No. 447,245
2 Claims. (Cl. 310—42)

This invention relates to a rotor shaft bearing. The present application is a continuation-in-part of application 84,410, filed Jan. 23, 1961, now abandoned.

The invention is exemplified in the disclosed embodiment, which is an improvement upon U.S. Patent No. 2,904,709. The construction is one in which the rotor is rotatable upon a stationary shaft. The shaft is supported at one end only on a non-magnetic bracket spanning a cylindrical bore in the stator field laminations. The bore is defined by cylindrically finished polar portions of the stator extending into close proximity to the rotor at opposite sides of the bore. The rotor may or may not be an armature of an electric motor.

It has always been very difficult to locate the shaft directly upon and exactly aligned with the axis of the bore. In a motor, the rotor should be at the center of the said cylindrical field pole surfaces. The slightest offset or tilt of the shaft subjects the rotor to varying magnetic action which results in vibration and bearing wear and noise. In the past, the shaft has been pressed to a driven fit in a hole provided in the bracket. Any mechanical error in the formation of the bracket, or its attachment to the stator laminations, or in the location of the angle of the hole in the bracket, or in the drive fit of the shaft in such hole, has resulted in production of a motor which is objectionable in the foregoing respects.

The present invention contemplates a procedure whereby the shaft is accurately positioned by an expanding mandrel directly from the field polar surfaces at opposite sides of the stator bore. The hole in the bracket is materially larger than the shaft in cross section. At intervals about the hole in the bracket, there are splines which are integral parts of the bracket and each of which co-operates with splines angularly spaced therefrom to provide inwardly converging surfaces as best shown in FIG. 5.

After the shaft is centered with precision on the axis of the cylindrical polar surfaces it is connected with the bracket by casting or molding a bonding insert to the shaft and to the bracket. The shaft is held in its precisely aligned and centered position until the cast material sets about it. Three types of material have been found appropriate for use in the casting operation. Any casting resin is usable, although less desirable at present because of the time required for setup. Type metal is also appropriate. However, the most satisfactory material found to date is conventional die casting zinc alloy.

The cast material may actually be of identical composition with that of the bracket and still will not fuse or bond thereto because the cast metal, in such a case, sets instantly upon contact with the previously cast bracket. Its mass is so small that its heat cannot soften the surface of the bracket. Moreover, any such cast material tends to shrink slightly upon setup. In shrinking, it tightly engages the shaft but tends to pull away from the bracket.

Because the material which is cast about the end of the shaft to position the shaft with reference to the bracket does not fuse with the bracket, the hole in the bracket is non-circular, being provided with keys or integral splines having inwardly converging surfaces as above described. As the cast material shrinks in setting, the portions thereof which lie between the converging surfaces of the splines will be drawn inwardly by contraction of the material to wedge between such surfaces to provide an interlocked connection which is rigid and permanent even though the shrinking material does not bond to the bracket.

The cast material of the insert may actually be almost imperceptibly out of contact with the inner periphery of the opening 12 in the bracket, the anchoring interlock being limited to the engagement of the cast material with the inwardly converging surfaces of the splines 29. The more the shrinkage, the higher the wedging pressure between the cast material and these surfaces. Its lack of fusion has a very important and unexpected advantage in sound damping. The juncture between the bracket and the cast material in which the shaft is embedded provides a barrier against sound conduction.

Thus, not only does the structure and mode of manufacture as herein disclosed assure concentricity and squareness and rigidity, with resulting quietness, but even such minimum vibration as may occur is not transmitted to the stator frame of the motor. As a result, the motor is substantially entirely noiseless in operation.

The uniformity of air gap also improves constant torque performance, starting characteristics, bearing life and efficiency of operation.

In the drawings:

FIG. 1 is a view taken in section on the line 1—1 of FIG. 2 showing in axial section a motor embodying the invention.

FIG. 2 is a view in front elevation of the frame of a motor embodying the invention, the rotor being omitted.

FIG. 3 is a perspective view of the bracket which supports the armature shaft.

Figure 4:
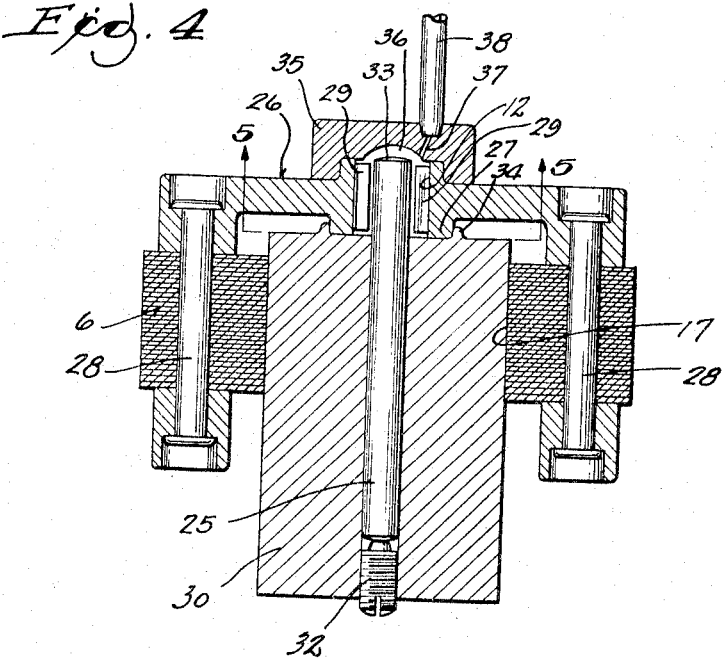
FIG. 4 is a diagrammatic view in axial section through the stator, the mandrel and the die shaft.
Figure 5:
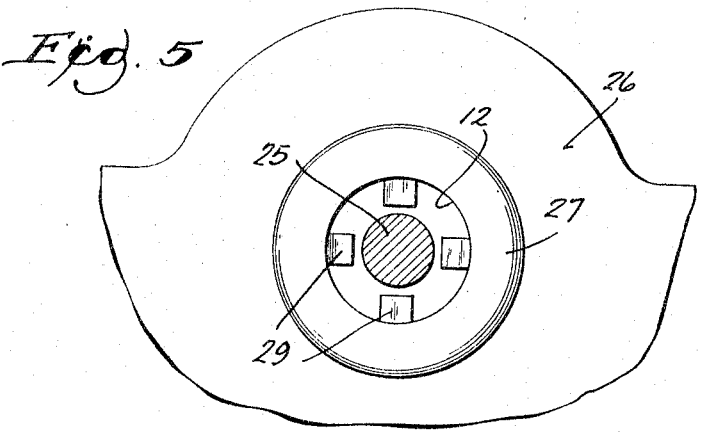
FIG. 5 is a fragmentary detail view taken in axial section on the line 5—5 of FIG. 4.

The magnet frame 6 is made conventionally of stator laminations which provide the polar portions 7 and 8. For strength, the laminations may be continuous about the stator bore but magnetic short circuiting is precluded by reducing the cross section at 9 and 10.

The winding 15 is formed on a separate core 16 dovetailed at its ends into the stator laminations of the frame 6.

The stator polar laminations are cylindrically finished at 17 to provide a stator bore 18 to receive the rotor 20. This rotor is mounted on a fixed shaft 25 supported from a bracket 26 which spans the stator bore. The bolts or rivets 28 extend through the laminations and the bracket and serve to maintain the frame in unitary assembly.

The prefabricated bracket 26 desirably comprises a die casting of non-magnetic metal such as zinc or type metal or an aluminum alloy. The material preferably used is known as die casting zinc alloy Zamak No. 3, also identified as SAE No. 903; government specification QQ-Z363. In composition, it is primarily zinc with aluminum 3.5 to 4.3 percent and magnesium 0.03 to 0.08 percent. Impurities should not materially exceed 0.1 percent maximum. Those found in test of a typical alloy are copper 0.007 percent; lead 0.005 percent; cadmium 0.005 percent; zinc 0.005 percent; and iron 0.100 percent.

Centrally the bracket has a boss 27 through which extends a non-circular opening 12. The surface of the bracket about the opening 12 is rough or irregular to provide an anchorage for the shaft-positioning metal cast in such opening as hereinafter described. In practice, the bridge member is die cast to provide anchorage lugs or ribs or splines such as those shown at 29 in FIGS. 3 and 4.

For the reasons previously noted, the armature bearing post or stationary shaft 25 is positioned directly from the cylindrical polar surfaces 17 of the stator bore 18, whereby no other assembly tolerance will in any manner affect its position. As one means of accomplishing this result, the shaft is temporarily positioned in a self-centering mandrel 30 which is inserted into the cylindrical stator bore to locate with precision the axis of such bore on which the shaft 25 is to be fixed. A set screw at 32 may be used to determine the axial position of the shaft 25 within the hole of mandrel 30. The end 33 of the shaft 25 may project slightly beyond the outer surface of the boss portion 27 of the bridge. The mandrel 30 may be provided with an annular terminal rib at 34 which seats on the inner side of the boss 27 of the bridge as a means of retaining in the opening 12 of the bridge the material to be cast therein to anchor the shaft. Thus the mandrel is also a part of the die assembly.

If the material is suitable for die casting, an external die 35 will desirably be applied as shown in FIG. 4 to embrace the outer side of the boss 27 of the bridge and to provide a cavity at 36 enclosing the end 33 of the shaft 25. A very small duct 37 is provided to place the interior of the die in communication with the conduit 38 from the pressure chamber in which the molten metal is stored for delivery to the die.

With the assembly completed as shown in FIG. 4, the material to be cast for the retention of the shaft 25 is delivered through conduit 38 and duct 37 into the chamber 36 of die 35 to flow into the non-circular opening 12 about the end of shaft 25 and about the ribs or irregularities 29 of the bracket 26. The duct 37 is so extremely small that the sprue breaks off when die 35 is removed, leaving no appreciable mark on the insert casting 40 which, as shown in FIG. 1 supports shaft 25 from bracket 26 in the precise position in which such shaft was located by the expanding mandrel directly from the cylindrical surfaces 17 of the stator. In other words, regardless of any irregularities in the form or mounting of the bracket, the shaft will always be located with precision in the exact center of the stator bore and in exact alignment with the axis of such bore.

As a result, the rotor will have precise concentricity and squareness with uniform air gap throughout. This will assure good starting torque in all rotor positions and constant torque performance in operation with substantially no vibration and excellent overall efficiency.

Not only is the rotor positioned with great precision but it is held with unusual rigidity on the desired axis of rotation. However, whether the embedding material for the bearing post 25 is die cast or comprises a casting resin, in either case there is no fusion between the cast insert 40 and the frame of the stator, the anchorage being mechanical and effected by wedging of the insert between the converging surfaces of the splines, said wedging resulting from shrinkage during setting and cooling of the insert and the resulting joint providing a sound conduction barrier. The present invention does not deal with prevention of imbalance in the rotor but, even if imbalance is present and results in vibration, the vibration is largely confined to the shaft and transmission of vibration to and through the stator frame is minimized by this construction.

I claim:
1. In an electric motor, the combination of a rotor, a fixed shaft having bearing support for said rotor, a stator, a shaft-mounting bracket connected with the stator and having an aperture, said bracket being provided at a plurality of points about said aperture with channels defined by surfaces converging toward the center of the aperture, said shaft having a portion in the aperture and free of direct connection with the bracket, and a cast insert in which said shaft portion is embedded and which substantially fills the aperture of the bracket and has portions in said channels wedged between said converging surfaces whereby said insert is accurately centered and is in mechanical unfused interlocked connection with the bracket, the said wedging of portions of the cast insert between the converging surfaces aforesaid being due to shrinkage of the cast insert, by which shrinkage the cast insert is slightly withdrawn from the bracket surfaces at the bottoms of said channels, the lack of fusion at the juncture between the bracket and the cast insert providing a barrier against sound conduction.

2. In an electric motor, the combination of a rotor, a fixed shaft having bearing support for said rotor, a stator, a shaft-mounting bracket connected with the stator and having an aperture, said bracket being provided at a plurality of points about said aperture with channels defined by surfaces converging toward the center of the aperture, said shaft having a portion in the aperture and free of direct connection with the bracket, and a cast insert continuous transversely across the end of said shaft portion and in which said shaft portion is embedded and enclosed and which substantially fills the aperture of the bracket and has portions in said channels wedged between said converging surfaces whereby said insert is accurately centered and is in mechanical unfused interlocked connection with the bracket, whereby the end of the shaft is enclosed within the cast insert.

References Cited by the Examiner

UNITED STATES PATENTS

| | | | |
|---|---|---|---|
| 1,136,557 | 4/1915 | Ross | 287—535 |
| 2,443,688 | 6/1948 | McFarland | 287—535 |
| 2,676,063 | 4/1954 | Whitt | 301—1 |
| 2,910,842 | 11/1959 | Sensenig | 64—4 |
| 3,121,179 | 2/1964 | Macks | 310—90 |

MILTON O. HIRSHFIELD, *Primary Examiner.*

J. J. SWARTZ, *Assistant Examiner.*